US006806475B1

(12) United States Patent
Lightfoot et al.

(10) Patent No.: US 6,806,475 B1
(45) Date of Patent: Oct. 19, 2004

(54) METHODS AND APPARATUS FOR INVESTIGATING EMISSIONS

(75) Inventors: John Adrian Lightfoot, Cumbria (GB); Karl Anthony Hughes, Cumbria (GB)

(73) Assignee: British Nuclear Fuels, PLC, Risley (GB)

( * ) Notice: Subject to any disclaimer, the term of this patent is extended or adjusted under 35 U.S.C. 154(b) by 82 days.

(21) Appl. No.: 10/089,594

(22) PCT Filed: Sep. 27, 2000

(86) PCT No.: PCT/GB00/03697

§ 371 (c)(1),
(2), (4) Date: Mar. 27, 2002

(87) PCT Pub. No.: WO01/23910

PCT Pub. Date: Apr. 5, 2001

(30) Foreign Application Priority Data

Sep. 27, 1999 (GB) .............................. 9922754

(51) Int. Cl.[7] ................................. G01T 1/20
(52) U.S. Cl. .................. 250/395; 250/363.04
(58) Field of Search ............... 250/395, 393, 250/363.04, 363.1, 366

(56) References Cited

U.S. PATENT DOCUMENTS 4,047,147 A    9/1977   Wood et al. ................ 340/3 R
5,739,845 A  * 4/1998   Hansford et al. ............. 348/83
6,528,797 B1 * 3/2003   Benke et al. ................ 250/393

FOREIGN PATENT DOCUMENTS

EP   0 542 561 A   5/1993   ............. G01T/1/00
FR   2 706 627 A   12/1994  ............. G01T/1/29

OTHER PUBLICATIONS

Jearl Walker, "The Pleasures of the Pinhole Camera and Its Relative the Pinspeck Camera," 1981, Scientific American 245(11) pp. 192–200.
Adam Lloyd Cohen, "Anti–pinhole Imaging," 1982, Optica Acta, vol. 29, No. 1, 63–67.

* cited by examiner

Primary Examiner—Constantine Hannaher
Assistant Examiner—Otilia Gabor
(74) Attorney, Agent, or Firm—Beyer Weaver & Thomas LLP

(57) ABSTRACT

The invention provides improved methods and apparatus for investigating emissions from radioactive sources within an environment. In particular, the method deploys a collimated detector to scan the environment and obtain approximate position information on sources within that environment together with further investigations using a moveable shielding component which is moved relative to the field of view of the collimator. In an alternative technique, the collimator is moved in two different directions to achieve positional information using scanning.

36 Claims, 5 Drawing Sheets

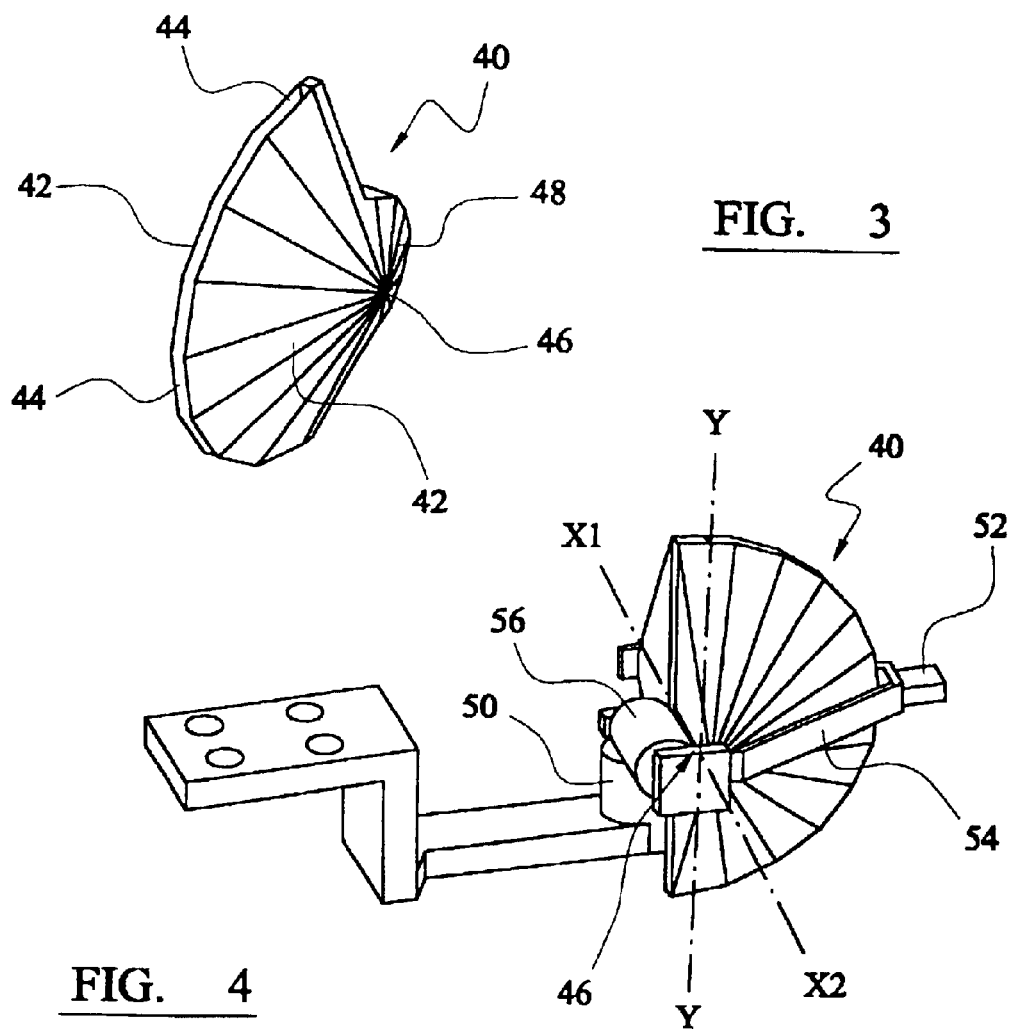
FIG. 3
FIG. 4
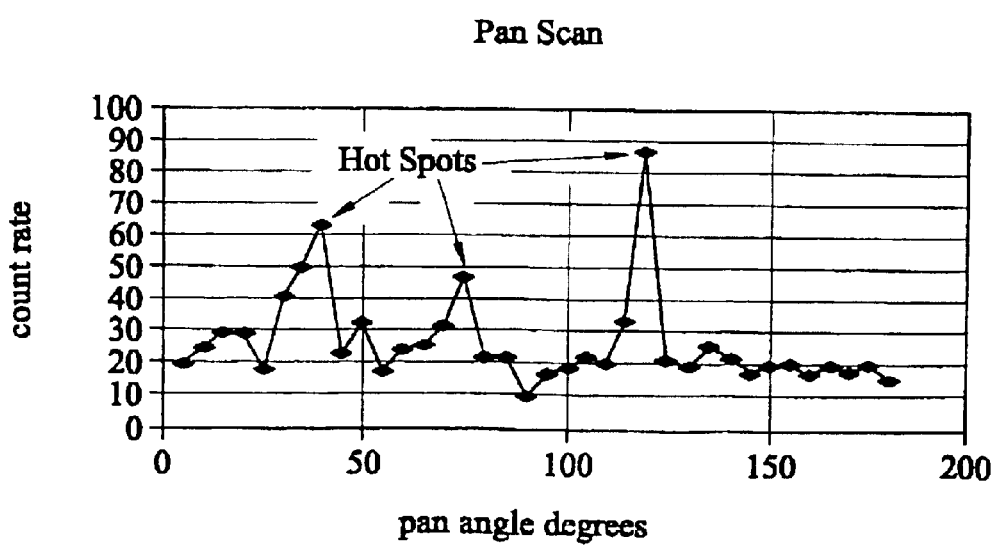
FIG. 5

METHODS AND APPARATUS FOR INVESTIGATING EMISSIONS

This invention concerns improvements in and relating to methods and apparatus for investigating emissions, particularly, but not exclusively in relation to gamma emissions.

During a number of tasks involving radioactive materials it is desirable to be able to accurately determine the position and level of radioactive materials within an environment. The environment may be a room or vessel in which operations involving radioactive material have been conducted and/or situations where decommissioning is required. To enable efficient decommissioning and/or to ensure man access under appropriate conditions to such environments accurate level and positional information is needed.

It is known to use a collimated gamma detector of the type referred to in EP 0542561 or WO 98/52071 to investigate gamma contamination. To achieve information about the sources of radiation the detector is collimated to give a conical field of view, with apex angle of less than 10°. This necessitates a significant length for the collimator. Furthermore, as the counts arising from the field of view must be very much higher than those penetrating the collimator from other directions to ensure meaningful measurements, the collimator must present a substantial thickness of material, 50 mm or more, around the detector. As a consequence the collimator alone has a substantial mass, 40 kg. The physical dimensions and properties necessary to achieve successful operation thus impair or prohibit the use of such instruments in locations for which access is limited, by the size of available entrance apertures for instance. Specific new entries to such locations are thus needed in such prior art systems or limited information on the radioactive materials must be tolerated.

The present invention has amongst its aims to provide an instrument which is capable of introduction into environments for which access is awkward or impaired. The present invention has amongst its aims to provide accurate and detailed information. The present invention has amongst its aims to operate and be capable of achieving such results in a practical time period.

According to a first aspect of the invention we provide a method of investigating emissions from radioactive sources in an environment, the method comprising:

providing an instrument, the instrument having a detector assembly, the detector assembly including a detector, preferably a single detector, which generates a signal in response to a detected emission, the detector being provided with a greater level of shielding against emissions in one or more directions than in one or more other directions to define the field of view of the environment for the detector, and a moveable shielding component which is moveable relative to the field of view;

introducing the detector assembly of the instrument into the environment;

obtaining a signal count and/or count rate from the detector with at least a part of the environment with the field of view, the moveable shield being out of the field of view, the result forming the reference count and/or reference count rate for that given field of view;

obtaining a signal count and/or count rate from the detector for the given field of view, with a part of the given field of view occluded by the moveable shielding component, the result forming the partially occluded view's count and/or count rate for that given field of view with that given part occluded;

for a given occluded part of a given field of view, the reference count and partially occluded view count and/or reference count rate and partially occluded view count rate being considered against one another to provide information about the emissions arising from the given field of view.

The first aspect of the invention may include any of the features, options or possibilities set out elsewhere in this document including the second aspect of the invention.

The first aspect of the invention may particularly include obtaining a signal count and/or count rate from the detector with at least part of the environment within the field of view, the moveable shielding component being out of the field of view; moving at least part of the detector assembly to place at least another part of the environment within the field of view and obtaining a signal count and/or count rate from the detector for that field of view, the moveable shielding component being out of that field of view; considering the counts and/or count rates obtained from the two or more different fields of view and selecting one or more areas of the environment for further investigation; the reference count and/or reference count rate being obtained for at least part of a selected area of the environment.

According to a second aspect of the invention we provide a method of investigating emissions from radioactive sources in an environment, the method comprising:

providing an instrument, the instrument having a detector assembly, the detector assembly including a detector which generates a signal in response to a detected emission, the detector being provided with a greater level of shielding against emissions in one or more directions than in one or more other directions to define the field of view of the environment for the detector, and a moveable shielding component which is moveable relative to the field of view;

introducing at least the detector assembly of the instrument into the environment;

obtaining a signal count and/or count rate from the detector with at least part of the environment within the field of view, the moveable shielding component being out of the field of view;

moving at least part of the detector assembly to place at least another part of the environment within the field of view and obtaining a signal count and/or count rate from the detector for that field of view, the moveable shielding component being out of that field of view;

considering the counts and/or count rates obtained for the two or more different fields of view and selecting one or more areas of the environment for further investigation;

obtaining a signal count and/or count rate from the detector with at least a part of a selected area of the environment within the field of view, the moveable shield being out of the given field of view, the result forming the reference count and/or reference count rate for that given field of view;

obtaining a signal count and/or count rate from the detector for the given field of view, with a part of the given field of view occluded by the moveable shielding component, the result forming the partially occluded view count and/or count rate for that given field of view with that given part occluded;

for a given field of view and a given part occluded, the reference count and partially occluded view count and/or reference count rate and partially occluded view count rate being considered against one another to provide information about the emissions arising from the given field of view.

The first and/or other aspects of the invention may include any of the features, options or possibilities set out elsewhere in this document, and in particular in the following statements.

Preferably the method of investigating emissions is a method for determining the position of one or more radioactive sources in an environment which generate emissions and/or a method for determining the level of emissions arising from one or more radioactive sources in an environment. The method may achieve one or both of these measurements for at least part of a field of view, preferably all, with the detector in a fixed position relative to the environment during the measurement. The method may achieve one or both of these measurements by using a single field of view for the instrument. The method may achieve one or both of these measurements by occluding a non-converging, preferably diverging part of the field of view. The method may achieve one or both of these measurements by occluding a single part of the field of view of the instrument for each partially occluded view count and/or count rate obtained.

The emissions may be alpha and/or beta and/or gamma emissions, but are preferably gamma emissions.

The radioactive sources may be nuclear fuel, components used in the manufacture thereof, spent nuclear fuel, components thereof, fission products, radioactive waste, residues or the like.

The environment may be a room, chamber, cell, vessel, container, pipe, conduit, nuclear reactor core or part thereof.

The detector assembly preferably provides support for the detector, shielding for the detector and moveable shielding component. Preferably the detector assembly provides means for varying the position of the detector and/or shielding for the detector and/or moveable shielding component. The position varying means may include a rotatable mounting for the detector and/or the shielding for the detector and/or the moveable shielding component. The rotatable mounting or mountings may allow rotation about two axis, preferably provided at 90° to one another. The position varying means may include one or more drive means, for instance motors, for varying the position of the detector and/or shielding for the detector and/or moveable shielding component. A separate drive means may be provided for each direction of rotation, more preferably for each direction of rotation for each of the shielding for the detector and the moveable shielding component.

In one preferred embodiment of the detector assembly, particularly suited to the hereinafter mentioned first detector/detector shielding/moveable shielding component configuration, the detector and detector shielding are rotatably mounted about a first axis and the moveable shielding component is rotatably mounted about a second axis. It is preferred that these first and second axis are perpendicular to one another. It is preferred that a drive means, such as a motor, is provided for each of these axis. It is preferred that the first axis is substantially, for instance +/−10°, vertical. It is preferred that the second axis is substantially, for instance +/−10°, horizontal.

In a further preferred embodiment of the detector assembly, particularly suited to the hereinafter mentioned second detector/detector shielding, moveable shielding component configuration, the detector and detector shielding are rotatably mounted about a first axis and a second axis and the moveable shielding component is rotatably mounted about a first axis and a second axis. Preferably the two first axis are separate from one another and/or the two second axis are separate from one another. Preferably the two first axis and/or two second axis are parallel to one another. Preferably the two first axis are perpendicular to the two second axis.

The detector is preferably a gamma detector, for instance of the scintillator or semi-conductor type. Preferably the signals generated by the detector are conveyed to a location outside the environment for processing. It is preferred that a single detector is provided within the instrument. In this way, a single well defined field of view for the instrument is assured.

A detected emission may be an emission reaching the detector from the field of view and/or through the shielding. Preferably the contribution to the detected emissions from the field of view is at least five times, and more preferably at least ten times, the contribution of detected emissions passing through the shielding for the detector.

Preferably the greater level of shielding against emissions in one or more directions is provided by a collimator for the detector. The shielding may be of lead or tungsten. Preferably, other than in the field of view, the detector is provided with at least 15 mm and more preferably at least 20 mm of shielding between it and the environment. Preferably, other than in the field of view, the detector is provided with less than 40 mm and more preferably less than 32 mm of shielding between it and the environment. The detector may be provided with a consistent thickness of shielding between itself and the environment in all directions, other than those within the field of view. Preferably no shielding, excluding the moveable shielding component when present, between the detector and the environment is provided within the field of view.

In a preferred embodiment, particularly suited to the hereinafter mentioned first detector/detector shielding/moveable shielding component configuration, the shielding may include a first generally planar component and a second generally planar component with a gap between them, at least in part, defining the field of view. The surfaces of the planar components which oppose one another are preferably planar surfaces. The surfaces of the planar components which oppose one another are preferably parallel with one another. The planar components may diverge away from one another, in the direction away from the detector. The outside surfaces, the non-opposing surfaces, of the shielding may be non-planar, for instance of greater thickness in proximity with the detector than distal from it, in one or more directions. The shielding may be provided with a dome, protrusion or other form of increased thickness in proximity with the detector, for instance an increased thickness along an axis of rotation of the detector and/or an axis of rotation passing through the detector. The shielding may be generally scalloped shape. Preferably the gap between the first and second component is closed by shielding around part of the detector to, at least in part, define the field of view.

In a further preferred embodiment, particularly suited to the hereinafter mentioned second detector/detector shielding/moveable shielding component configuration, the shielding may comprise a first conical portion. The first conical portion is preferably truncated at the end distal to the detector. The truncation is preferably perpendicular to the axis of the conical portion. The shielding may include a second conical portion, preferably abutting and ideally abutting at a corresponding diameter to the first conical portion. Preferably the second conical portion tapers, ideally away from the detector and/or in the opposing direction to the taper of the first conical portion. The second conical portion is preferably truncated at the end distal to the detector. The truncation is preferably perpendicular to the axis of the conical portion. The detector is preferably provided on the axis of the conical portion or conical portions. The detector is preferably provided on the plane defined by the junction of the first and second conical portions.

The detector may be provided with a field of view consisting of less than 30% of the potential views leading from the centre of the detector to the environment and the level may be more preferably be less than 25% or even less than 15%. Preferably the level is greater than 2% and more preferably greater than 5% or even greater than 10% of the potential views.

The field of view may be provided with a symmetrical cross-section. The field of view may be symmetrical in all directions, for instance a cone, or may have only restricted symmetry, for instance a slice.

The field of view, particularly for a conical field of view, preferably has an angular extent of less than 90°, more preferably less than 60°, and ideally less than 45°. Preferably the field of view has an angular extent of at least 5°, more preferably at least 15°, and ideally at least 25°. An angular extent of between 30° and 40° is particularly preferred. The angular extent may apply to one direction, or all for conical fields of view.

The field of view, particularly for a slice type field of view, preferably has an angular extent in the first direction of between 1° and 15°, more preferably between 2° and 10° and ideally between 3° and 8°. The field of view in a second direction, ideally the second direction being perpendicular to the first direction, may be between 45° and 360° and more preferably between 160° and 200°. Preferably the angular extent in the first direction is constant throughout the angular extent in the second direction. In this way, a slice may be defined.

Preferably the moveable shielding component is provided of the same shielding material as the other shielding. Preferably the moveable shielding component has a substantially uniform extent, between the detector and the environment, within the field of view. Preferably the moveable shielding component obscures between 0.5% and 15% of the field of view, and more preferably between 5% and 10%.

Preferably the means for providing an optical image of the environment, and particularly the field of view, is provided as a part of the moveable shielding component. Preferably the means for providing the optical image of the environment is mounted on the moveable shielding component, ideally on the outside relative to the detector. Preferably the centre of the field of view of the means for providing an optical image of the environment lies on a line projected from the detector through the centre of the moveable shielding component. The means for providing the optical image may be a video camera and/or a still camera. Preferably a still image is used in the results display.

Preferably the moveable shielding component can be positioned at one or more locations outside the field of view. Preferably the moveable shielding component can be positioned at a plurality of positions within the field of view, more preferably positions throughout the field of view are facilitated and ideally sufficient positions to entirely cover the field of view, in total, are facilitated.

The detector assembly may be introduced into the environment by insertion through an aperture. The aperture may be of circular cross-section. The aperture may extend through a shielded wall into the environment. The aperture may have a maximum diameter and/or width of less than 200 mm, less than 150 mm or even less than 100 mm. The maximum width may be the diameter of the aperture. The detector assembly may be mounted on one end of a body with a portion of the body being retained in the aperture leading to the environment during measurement. The body may be supported within the aperture by one or more elements depending from the body, for instance legs which engage one or more walls of the aperture. The dependent elements may be provided with a rolling contact between themselves and the aperture wall or walls.

The detector assembly may be mounted on a tripod or other form of support. The tripod or other form of support may be deployed within the environment. The tripod or other form of support may be introduced to the environment by a robotic arm or other form of remote controlled manipulator.

A signal count and/or count rate for a field of view, with the moveable shielding component out of the field of view, may be determined using a count period of less than 5 minutes, more preferably less than 1 minute and ideally less than 30 seconds. Preferably the part of the environment in the field of view is fixed during the determination of a signal count and/or count rate.

Preferably the moveable shielding component is out of the field of view by being positioned at a location where shielding is provided between the moveable shielding component and the detector. Preferably the moveably shielding component is pivoted to this position. Preferably the part of the detector assembly moved to place at least another part of the environment within the field of view includes the detector and the shielding for the detector. The moveable shielding component may also be moved. The movement may be a rotation of that part of the detector assembly about one or more axis.

In one embodiment of the invention, particularly suited for the hereinafter mentioned first detector/detector shielding/moveable shielding component configuration, the detector, detector shielding and moveable shielding component are moved by rotation about a single axis. Preferably rotation is about a substantially vertically aligned axis, ideally without any rotation about any other axis.

In another embodiment of the invention particularly suited to the hereinafter referred to second detector, detector shielding, moveable shielding component configuration, the detector, detector shielding and moveable shielding component are moveable in rotation about one or both of two axis. Preferably rotation is about a first axis, with the position about the second axis fixed, until all desired fields of view at that fixed position for the rotation about the second axis have been considered. This may then be followed by a variation in the position about the second axis followed by rotation about the first axis to all desired fields of view.

Different fields of view may be considered sequentially, moving from one field of view to an adjoining one. An adjoining field of view may be horizontally and/or vertically adjoining and/or tilt angles for the detector and/or detector shielding may be changed to vary the part of the environment in the field of view.

Signal counts and/or count rates for a plurality of different parts of the environment may be determined by providing those different parts within different fields of view. Preferably signal counts and/or count rates for all parts of the environment for which investigation is required are performed. Parts of the environment may be investigated using overlapping and/or abutting fields of view. The environment may be divided into ten, fifty or even a hundred or more different fields of view.

The consideration of the counts and/or count rates from two or more different fields of view may involve considering those fields of view which produce high counts and/or count rates, and/or those fields of view which produce low counts and/or count rates and/or those fields of view which have counts and/or count rates above or below a threshold level. Preferably those fields of view relating to higher counts and/or count rates are selected. A higher count and/or count rate may be taken as indicative of one or more sources being within that particular field of view. A lower count rate may be taken as indicative of an absence of source from within that particular field of view.

The selected one or more areas for further investigation may in each case individually, be an area larger than any given field of view, any area corresponding to a given field of view or an area forming part of a given field of view.

The selection may also include the selection of one or more fields of view to investigate each of those one or more areas. The selection may involve selecting one or more of the previously measured fields of view for use in the further investigation and/or one or more fields of view not corresponding to a previously measured field of view. The field of view relating to a selected area may be a field of view for which a count and/or count rate has been determined before the selection of the areas is made and/or may be a new field of view. Where the field of view is a preexisting one, the previously obtained count and/or count rate may be used to form the reference count and/or reference count rate for that selected field of view. Where the field of view is a new one, a count and/or count rate from the detector for that field of view is obtained with the moveable shielding component being out of the field of view, that signal count and/or count rate forming the reference count and/or reference count rate for that selected field of view.

Preferably partially occluded view signal counts and/or count rates are obtained for a given field of view with a plurality of different parts of that given field of view occluded. Preferably the partially occluded view count and/or count rates for this plurality of different occluded views are considered together with the reference count and/or reference count rate for the given field of view to provide information about the emissions arising from that given field of view.

The method may include obtaining a signal count and/or count rate with each part of the given field of view occluded or only selected parts of the given field of view occluded, for instance where the area selected is smaller than the field of view.

Different partially occluded views are preferably obtained by moving the moveable shielding component within the field of view of the detector, preferably with the field of view of the detector fixed. The moveable shielding component may be made between each count and/or count rate determination by an amount less than its extent in the direction of movement, an extent equal to its extent in the direction of movement or by an extent in the direction of movement greater than its extent. Preferably the moveable shielding component has a fixed position during count and/or count rate determination. A count and/or count rate determination of less than 2 hours is preferred, more preferably less than 10 minutes and ideally less than 30 seconds.

In one embodiment of the invention, particularly suited for the hereinafter mentioned first detector/detector shielding/moveable shielding component configuration, it is preferred that the moveable shielding component is moved by rotation about a single axis, most preferably a horizontally aligned axis, and ideally with no rotation about any other axis. It is particularly preferred that the moveable shielding component be moved so as to occlude the entire extent of the field of view in one direction, for instance the entire width of a slice like field of view. Preferably the moveable shielding component is moved from one end of the field of view to the other, ideally occluding all the field of view over time.

In another embodiment of the invention, particularly suited for the hereinafter second detector/detector shielding/moveable shielding component configuration, the moveable shielding component is preferably moved by rotation about one or both of two axis. Preferably rotation is about a first axis, with the position about the second axis fixed, until all desired occluded views for that field of view at that fixed position for the second axis have been considered. This may then be followed by a variation in the position of the moveable shielding component by rotation about the second axis, followed by rotation about the fixed axis to all desired partially occluded views for the field of view.

Different occluded views may be considered sequentially, moving from one occluded view to an adjoining one. An adjoining occluded view may be horizontally and/or vertically adjoined.

Pan and/or tilt angles for the moveable shielding component may be changed to vary the part of the field of view which is occluded.

The consideration may involve determining which location or locations within the selected areas of the environment are significant contributors to the count and/or count rate, and/or determining which location or locations within the selected areas of the environment are not significant contributors to the count and/or count rate. The consideration may involve determining those parts of the field of view which when occluded result in the most significant decrease in the count and/or count rate for the given field of view.

The level of emissions may be determined based on the variation in count and/or count rate occurring with a part of the field of view occluded or not. The level may be indicated as a quantitative value and/or a range of quantitative values.

Preferably count rates are determined in the various stages.

Preferably the location of the source is determined in three dimensions. The location may be expressed in terms of determined by the tilt and pan angles of the detector assembly and/or the position within the environment indicated by the field of view for that count and/or count rate results. The location may also be determined in terms of the distance from the detector to the location. A range finding device may be employed on the instrument to assist in this determination. A laser range finder may be used.

The method may include taking video camera or camera images of the environment. The visual images may indicate the field of view under investigation by the instrument. Recordal facilities for the visual images may be provided. The information on the positions and/or levels of the sources may be indicated on the visual images.

In one embodiment, the collimator may be panned and/or tilted to various angles to provide different fields of view of the environment. Preferably the method includes sequentially moving the field of view by varying the tilt or pan angle and maintaining the other of the tilt or pan angle constant. In such a case, once the full range of the one of tilt or pan angles have been investigated at a respective pan or tilt angle, then the pan or tilt angle can be changed and the process repeated for the full range of tilt or pan angles. Preferably, particularly in such cases, the moveable shielding element may be adapted to be provided at various tilt and/or pan angles. In this way all of the different potential parts of the field of view may be occluded through suitably varying tilt and/or pan angles. Preferably one of the tilt and/or pan angles is kept constant and the other is varied to obscure sequentially the different parts of the field of view at that given constant tilt and/or pan angle. Preferably this is followed by a change in that tilt or pan angle and then variation of the other of the tilt or pan angle so as to scan the moveable shielding element across the field of view.

According to a third aspect of the invention we provide an instrument, the instrument having a detector assembly and signal processing means, the detector assembly including a detector which generates a signal in response to a detected emission, the detector being provided with a greater level of shielding against emissions in one or more directions than in one or more other directions to define the field of view of the environment for the detector and including a moveable shielding component which is moveable relative to the field of view. The detector assembly being provided with a single detector.

According to a fourth aspect of the invention we provide an instrument, the instrument having a detector assembly and signal processing means, the detector assembly including a detector which generates a signal in response to a detected emission, the detector being provided with a greater level of shielding against emissions in one or more directions than in one or more other directions to define the field of view of the environment for the detector and including a moveable shielding component which is moveable relative to the field of view, the field of view consisting of less than 30% of the potential view directions leading from the centre of the detector to the environment.

The third and/or fourth aspects of the invention may include any of the features, options or possibilities set out in the first and/or second aspects of the invention and/or elsewhere in this document.

The first and/or second and/or third and/or fourth aspects of the invention may include any of the features, options or possibilities set out in the fifth and sixth aspects of the invention below, and in particular may include the first and/or second orientation scans provided thereby before and/or after the sequence of the first and/or second and/or third and/or fourth aspects of the invention; and/or the further processing by statistical analysis.

According to a fifth aspect of the invention we provide a method of investigating emissions from radioactive sources in an environment, the method comprising:
providing an instrument, the instrument having a detector assembly, the detector assembly including a single detector which generates a signal in response to a detected emission, the detector being provided with a greater level of shielding against emissions in one or more directions than in one or more other directions to define the field of view of the environment for the detector;
introducing the detector assembly of the instrument into the environment;
obtaining a signal count and/or count rate from the detector with at least a part of the environment within the field of view, the result forming the reference count and/or reference count rate for that field of view;
changing the orientation of the detector assembly;
obtaining a signal count and/or count rate from the detector with a further part of the environment within the field of view, the result forming a reference count and/or reference count rate for that further field of view;
the further field of view including only a part of the field of view within it;
the reference count and/or reference count rate for the field of view and the further field of view being considered to provide information about the emissions arising from that part of the further field of view which included part of the field of view within it.

Preferably the orientation is changed between obtaining the signal count and/or count rate for the field of view and further field of view by moving an axis of rotation for the detector assembly. Preferably the axis is moved by rotating the axis, ideally by rotating the axis through 90 degrees.

Preferably a signal count and/or count rate for one or more other fields of view are obtained, preferably prior to moving the axis of rotation of the detector assembly. Preferably the other fields of view are brought into view by changing the orientation of the detector assembly by rotating the detector assembly about an axis.

Preferably a signal count and/or count rate for one or more still further fields of view are obtained, preferably after the further field of view is considered. Preferably the still further fields of view are brought into view by changing the orientation of the detector assembly by rotating the detector assembly about an axis.

According to a sixth aspect of the invention we provide a method of investigating emissions from radioactive sources in an environment, the method comprising:
providing an instrument, the instrument having a detector assembly, the detector assembly including a single detector which generates a signal in response to a detected emission, the detector being provided with a greater level of shielding against emissions in one or more directions than in one or more other directions to define the field of view of the environment for the detector,
introducing the detector assembly of the instrument into the environment;
obtaining a signal count and/or count rate from the detector with at least a part of the environment within the field of view, the result forming the reference count and/or reference count rate for that field of view;
changing the orientation of the detector assembly by rotating the detector assembly about an axis with the axis in a first orientation, so as to view one or more other parts of the environment;
obtaining a signal count and/or count rate from the detector for each of the other fields of view when the other parts of the environment are within view, the results forming a reference count and/or reference count rate for each of the other fields of view;
changing the orientation of the axis about which the detector assembly is rotated;
obtaining a signal count and/or count rate from the detector with a further part of the environment within the field of view, the result forming a reference count and/or reference count rate for that further field of view;
changing the orientation of the detector assembly by rotating the detector assembly about the axis with the axis in the changed orientation so as to view one or more still further parts of the environment;
obtaining a signal count and/or count rate from the detector for each of the still further parts when the still further part of the environment is within the field of view, the results forming a reference count and/or reference count rate for each of the still further fields of view;
one or more of the further field of view and still further fields of view including a part of the field of view and/or one of the other fields of view;

the reference count and/or reference count rate for the field of view, the other fields of view, the further field of view and the still further fields of view being considered to provide information about the emissions arising from those parts of the further field of view and/or still further fields of view which include at least a part of the field of view and/or other fields of view within them.

The fifth and/or sixth aspects of the invention may include any of the features, options or possibilities set out elsewhere in this document, but the following statements have particular relevance.

In one preferred embodiment the detector assembly is rotatably mounted about a first axis having a first orientation and a second orientation, the axis being moveable between the first and second orientations. The first and second orientations may be perpendicular to one another. It is preferred that a drive means, such as a motor, is provided to move the detector assembly between the two orientations. It is preferred that the first orientation provides a substantially, for instance +/−10°, vertical axis. It is preferred that the second orientation provides a substantially, for instance +/−10°, horizontal axis. The first orientation and/or second orientation may provide non-vertical and/or non-horizontal axes. The first orientation may provide an axis which is substantially, for instance plus or minus 10°, perpendicular to and/or substantially, for instance plus minus 10° parallel to an edge and/or axis of the environment and/or an edge and/or an axis of a part of the environment. The part of the environment may be a conduit, passage, pipe, glove box, container, work surface, cable array. The second orientation may provide an axis which is substantially, for instance plus or minus 10°, perpendicular to and/or substantially, for instance plus or minus 10° parallel to an edge and/or axis of the environment and/or an edge and/or an axis of a part of the environment. The first and/or second orientation may use axes which are perpendicular to one another, but non-perpendicular axes may be employed.

The method may include the selection of a first orientation and/or a second orientation. The selection may be based on the configuration of the environment and/or a part thereof, and in particular be based upon a junction, edge or axis alignment of the environment or a part thereof. Third, fourth or further orientations may be selected for scanning based on such features of the environment and/or a part thereof.

The detector and/or detector assembly may be moved relative to the environment between the first and second orientation. In particular the detector and/or detector assembly may be moved closer to a part of the environment. The detector and/or detector assembly may be moved by inserting the detector assembly into the environment to a further extent.

The position of the detector and/or a detector assembly relative to the environment in a first orientation and/or in the second orientation, the position being different between the two, may be used to provide further information about the emissions arising using a triangulation.

In a preferred embodiment, the shielding of the detector assembly may include a first generally planar component and a second generally planer component with a gap between them, at least in part, defining the field of view. The surfaces of the planar components which oppose one another are preferably planar surfaces. The surfaces of the planar components which oppose one another are preferably parallel with one another. The planar components may diverge away from one another, in the direction away from the detector. The outside surfaces, the non-opposing surfaces, of the shielding may be non-planar, for instance of greater thickness in proximity with the detector than distal from it, in one or more directions. The shielding may be provided with a dome, protrusion or other form of increased thickness in proximity with the detector, for instance an increased thickness along an axis of rotation of the detector and/or an axis of rotation passing through the detector. The shielding may be generally scalloped shape. Preferably the gap between the first and second component is closed by shielding around part of the detector to, at least in part, define the field of view.

The field of view is preferably consistent between the field of view, other field of view, further field of view and still further field of view, only the portion of the environment being viewed changing between them. It is preferred that the field of view be slice shaped, for instance defined by two non-parallel planes which oppose one another and two further non-parallel planes which oppose one another, the planes being separated by an arc in each case.

Preferably the field of view has an angular extent in the first direction of 10° or less, more preferably 6° or less and ideally between 4° and 6°. The field of view in a second direction, ideally the second direction being perpendicular to the first direction, may be between 45° and 360° and more preferably between 160° and 200°. Preferably the angular extent in the first direction is constant throughout the angular extent in the second direction. In this way, a slice may be defined.

The consideration of the counts and/or count rates from field of view and/or other fields of view and/or further field of view and/or still further fields of view may involve considering those views which produce high counts and/or count rates, and/or those views which produce low counts and/or count rates and/or those views which have counts and/or count rates above or below a threshold level. In particular the consideration may involve matching the field of view and/or the other fields of view with the further field of view and/or still further fields of view which produce high counts and/or count rates, and/or those views which produce low counts and/or count rates and/or those views which have counts and/or count rates above or below a threshold level. A match may suggest that the part of the further field of view and/or part of the still further fields of view within the field of view and/or other fields of view contains a significant source of radiation where a higher count or count rate is encountered or suggest a that the part does not contain a source of radiation where a lower count and/or count rate is encountered. A higher count and/or count rate may be taken as indicative of one or more sources being within a view. A lower count rate may be taken as indicative of an absence of sources from within a view.

The part of the field of view and/or other fields of view included within the further field of view and/or still further fields of view may be conical in shape, and in particular a square based cone, the detector being at the apex of that cone. The part may have an apex angle corresponding to the width angle of the field of view defined by the shielding.

Preferably the consideration suggests a location for the radiation within that part. The location of the source may be determined in three dimensions. The location may be expressed in terms of determined by the pan angles of the detector assembly in the first and second orientations and/or the position within the environment indicated by overlap between the field of view and/or other fields of view and the further field of view and/or still further fields of view. The location may also be determined in terms of the distance from the detector to the location. A range finding device may be employed on the instrument to assist in this determination. A laser range finder may be used. The information may provide an indication of one or more potential positions or locations of sources within the environment. The position and/or location may be expressed as an angle in one direction relative to a reference position and/or by an angle relative to a second reference position. In particular a horizontal angle and vertical angle may be used to indicate the location or positions where a single source is present preferably a single position and/or location is indicated. Where multiple sources are present, the information may include a set of locations and/or positions of which only some actually correspond to a source. The positions and/or locations in such a case may be expressed as an angle in a first direction and as an angle in a second direction, one or more of the angles in the first direction and/or in the second direction featuring as part of the location or position definition of two or more sources.

The information may be subjected to further processing, in particular to statistical analysis. The statistical analysis may involve comparison of the measured count or count rate for one or more of the fields of view against a predicted count or count rate for the field of view given a model source position and/or level and/or number of sources. The comparison preferably involves a plurality of the fields of view and ideally all of the fields of view from the first and/or second orientation. A least squares analysis may be used. Preferably alterations to the model source level and/or position and/or number of sources are made so as to minimise the difference between the measured count and/or count rates and the predicted count and/or count rates.

The measured count and/or count rates may be corrected according to one or more factors before the comparison is made. The correction factors may be based upon the response of the instrument, for instance of the detector, to one or more known source levels and/or positions and/or numbers. The correction factors may be based on the response of the collimator to one or more known source levels and/or positions and/or numbers.

Preferably the suggested location for the one or more sources of radiation within the environment is corrected based upon the model positions and levels which give counts and/or count rates which best correspond to the measured count and/or count rates.

Preferably two or more overlapping fields of view in the first and/or second orientation are used when statistical analysis is deployed. Preferably all of the environments scanned in the first and/or second orientation is included within at least two fields of view which contribute to the scan for that orientation.

The method may include taking video camera or camera images of the environment. The visual images may indicate the field of view under investigation by the instrument. Recordal facilities for the visual images may be provided. The information on the positions and/or levels of the sources may be indicated on the visual images.

Various embodiments of the invention will now be described, by way of example only and with reference to the accompanying drawings in which:

FIG. 1 illustrates a collimator according to the prior art;

FIG. 2 schematically illustrates a detector assembly according to an embodiment of the present invention;

FIG. 3 illustrates a collimator according to an embodiment of the present invention;

FIG. 4 illustrates a detector assembly incorporating a collimator according to the embodiment of the present invention illustrated in FIG. 3;

FIG. 5 illustrates typical results obtained with varying pan angle using a detector according to the FIG. 3 embodiment of the invention;

Many situations in the nuclear industry, particularly in decommissioning operations, require rooms, chambers or other enclosures to be investigated to determine the level and location of any radioactive material within them.

Figure 1:
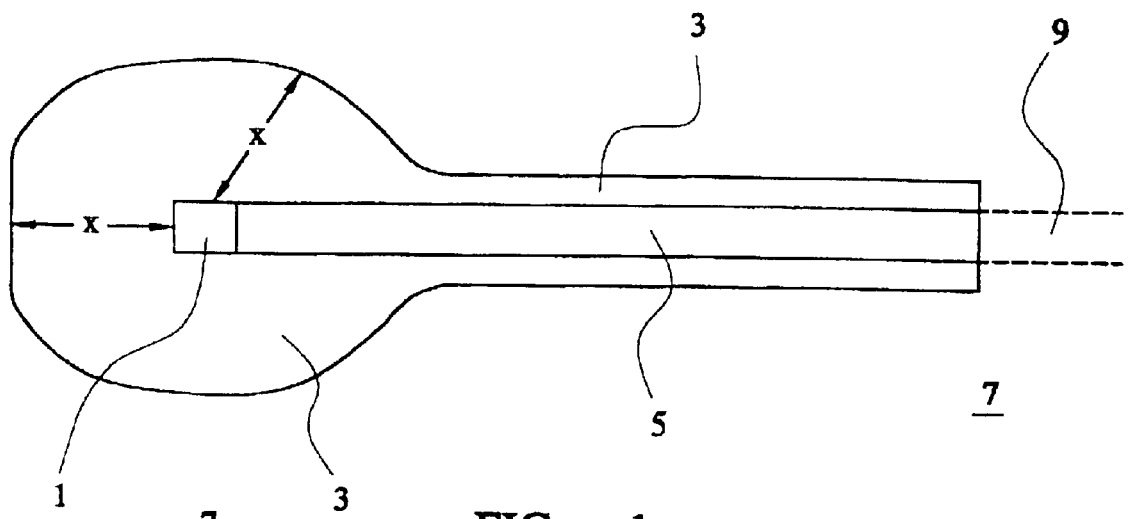

An instrument which is useful for this purpose for gamma monitoring is illustrated in FIG. 1. The detector 1 is enclosed within a large mass of tungsten 3. The tungsten 3 defines a passage 5 which opens from the detector 1 to the environment 7 around the instrument. The mass of tungsten 3 defines the field of view 9 of the detector 1 from which gammas will be detected, with gamma from other parts of the environment 7 being excluded from detection, as far as possible, to give a directionally sensitive instrument. To shield the detector 1 against as much as possible of any emissions arising outside the field of view 9 the tungsten 3 is thick, X=50 mm or more, and surrounds the detector 1 in almost all directions. The ability to exclude non-field of view emissions from detection is all important as the smaller the field of view and hence the greater the emission location resolution, the lower the count rate will be which is detected from that field of view. To get meaningful results, therefore, the count rate from emissions which penetrate the shielding must be as low as possible or that count will swamp the part of the count arising from the field of view 9.

It should also be borne in mind that the mass of the collimator which results from having to have this thickness of material present requires substantial support. Thus, the collimator itself must be supported by a frame provided around at least a portion of it, thereby increasing its size further. Where scanning or other movement of the collimator is required, then motors and pan and tilt facilities must be provided further increasing the overall dimensions of the detecting part of the instrument.

In many cases the existing access which is available to environments requiring monitoring is very limited, for instance elongate entrance tubes of 20 cm or less in diameter. In such situations access is not possible for the type of instrument exemplified by EP 0542561 or WO 98/52071 as the mass and physical dimensions of the collimation necessary to make such instruments function renders them physically too large to introduce. The construction of new access routes which are physically large enough is often not an option on cost and/or practical and/or safety grounds.

To address this problem an instrument has been developed by the applicant using a different approach to the detection/emission level and position determining process.

Figure 2:
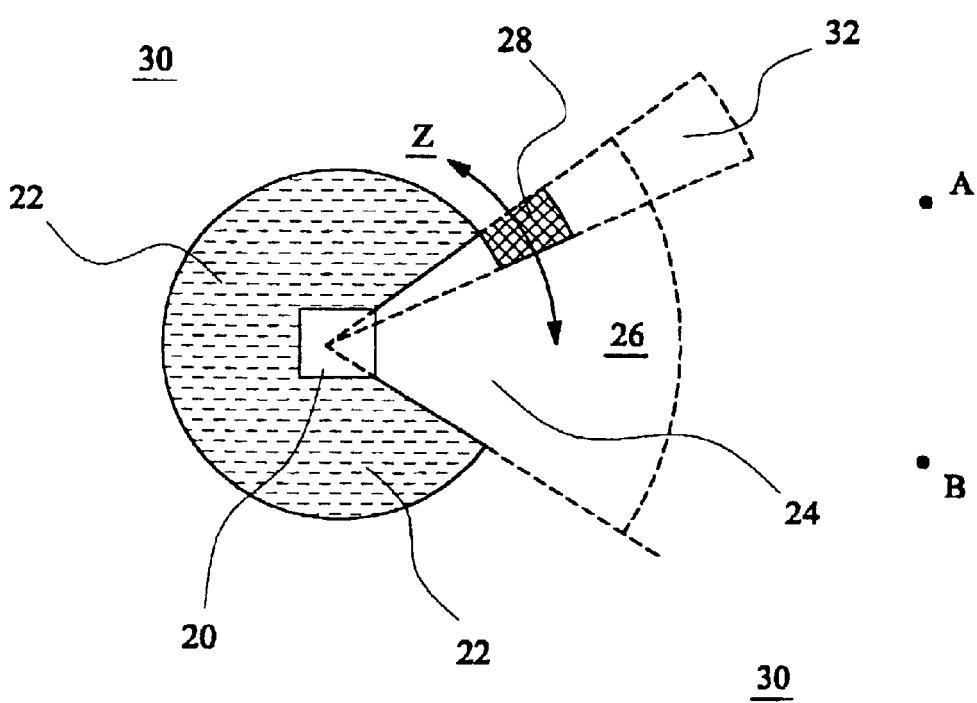

As illustrated in FIG. 2 the detector assembly is formed of an emission detector 20 surrounded in many directions by tungsten shielding 22. The shielding 22 is provided with a wide opening 24 which defines the field of view 26 of the detector 20. In addition to the shielding 22, a moveable shielding component 28 is provided which can be placed at different positions, both within the field of view 26 as shown, or removed from it, position Z.

In use, an instrument incorporating such a detector assembly is introduced into the environment 30 under consideration, potentially in a manner described in more detail below. The environment 30 is then investigated in a first part of the process by monitoring the count rates obtained with the field of view 26, defined by the shielding 22, pointing at an area of the environment. In this part of the process the moveable shielding component 28 is removed from the field of view 26. Once a count rate has been determined for that particular area, a different area is considered by moving the collimator 22 and hence field of view 26. A count rate for that new particular area is determined and so on. To vary the areas considered the field of view may be moved using varying tilt and pan angles for the detector assembly.

As the field of view 26 is relatively large, the count rate arising from emissions within this field of view is substantial, and as a consequence a 10:1 ratio between the field of view signal and signals arising from emissions passing through the shielding can be readily maintained even with a substantially diminished thickness for the shielding 22 when compared with the shielding thickness 3 of the prior art type collimator. However, this first part of the process provides only limited information on the location of the source. Thus, the presence of a source within the field of view 26 might be determined, but the instrument is unable to distinguish at the end of the first part of the process whether that source is at position A, position B, both or elsewhere within the field of view.

The count rates arising from this process do give an indication of the positions of radioactive sources as the count rates are higher for certain fields of view than for others even though the nature of the collimation by the shielding and the resultant large field of view mean that the resolution of information on the sources is relatively low.

To provide more detailed information parts of the environment which are established as containing sources, using the large field of view, are subjected to further investigation in a second stage. Those areas established as lacking significant sources do not generally need any further consideration and thus the first part of the process provides for the elimination of areas of the environment 30 from needing such detailed consideration and saves significant time periods compared with a detailed review of the entire environment.

In the second part of the process the detector assembly is directed so that its field of view includes the area for further investigation. If this field of view is identical with a field of view 26 in the first part of the process the count rate obtained in that first stage can be used in the second part as the reference count rate; if the field of view 26 is different then a count rate without the moveable shielding component 28 within the field of view 26 is taken to give the reference count rate.

With the detector assembly position fixed with the given field of view 26, the moveable shielding component 28 is moved so as to obscure a part of the field of view 26, the occluded view 32, and a partially occluded count rate is determined. The obscured view 32 is typically between 1 and 10% of the field of view 26 of the assembly.

This partially occluded count rate is determined over a significant period of time as the differences between reference count rate and partially obscured count rate are small (or potentially even non-existent if no sources are occluded) and so the count rates must be determined precisely to avoid errors dominating any difference. The difference between the partially occluded count rate and the reference count rate represents the contribution of the sources in the occluded view 32 to the reference count rate. By repeating the process with different parts of the field of view 26 obscured, the contribution of each of those occluded view 32 can be obtained. Processing of the overall results enables detailed information on the location of the sources to be determined and their respective levels.

As the occluded view 32 represents a relatively small area the effects of each of the small areas within the field of view 26 are determinable and substantial directional resolution is provided. The various occluded views 32 employed can be overlapped with one another, a partially occluded count rate determination being made for each, so as to reduce still further the effective part of the overall field of view 26 which provides the difference in count rate arising between those two or more partially occluded count rates.

The use of the two stages means that it is possible, through the first part, to rapidly investigate a large environment to determine where there is a need for more detailed investigation. This gives a significant time benefit to the process of investigating an environment fully. Surveying the whole environment using a technique based solely on a moveable shielding component would involve too great a time, potentially years for a moderate size room, to be practical. Furthermore, through the second part, it is possible to investigate the environment in detail where necessary on source position and/or level issues. Surveying the environment or parts there of in high resolution is not possible using the collimation described for the first part process. Surveying using the instruments typified in the prior art is not possible as the instrument cannot even be brought into the environment where space or access is limited. The combination of the collimation extent and the moveable shielding element also gives significant time benefits. The collimation restricts the field of view area which must be investigated to manageable levels for the moveable shielding component process to be practical on time grounds, whilst still giving sufficient resolution.

To perform the first part of the process and investigate large environments as quickly as possible it is particularly desirable to use the type of collimator illustrated in FIG. 3. This collimator 40 is formed of two, mirror image, disc shaped parts 42 which define between them a slit 44 having a 5° angle defined between lines projected so as to extend from the centre of the detector 46 to the edge line of slit 44. The slit 44 has this relatively narrow field of view in one direction, but extends through substantially 180° in the perpendicular direction. The detector 46 is provided at the centre of the slit 44, with a shielding mass 48 behind it and around it relative to the slit 44.

As illustrated in FIG. 4 such a collimator 40 is mounted such that the detector 46 lies on the Y axis about which the collimator 40 can be panned and such that the detector 46 lies on the X axis. A motor 50 is provided to pan the collimator 40. A moveable shielding component 52 is provided on arms 54 attached to motor 56. The motor 56 is provided to tilt the moveable shielding component 52 about the Y axis to the desired position.

In operation such an instrument is deployed in an environment and then, with the moveably shielding component 52 absent from the field of view, count rates are determined as the collimator 40 is panned from one side (direction of XI) to the other (direction of X2) to give a 180° sweep, transiting through the position shown in FIG. 4 at 90°. The result is that reference count rates for a large series of narrow slices of an environment are taken.

Where the environment is a room, a series of slices, each including a strip of the ceiling, wall and floor are taken at known pan angles. Typical results for such a process are illustrated in FIG. 5. This plot suggests that somewhere in the slices at approx. 40°, approx. 75° and approx. 120° are significant sources of emissions. Due to the shape of the slice responsible for the count rate, however, further investigation is needed to determine where, ceiling, wall or floor, the source or sources of emissions are.

Figure 6:
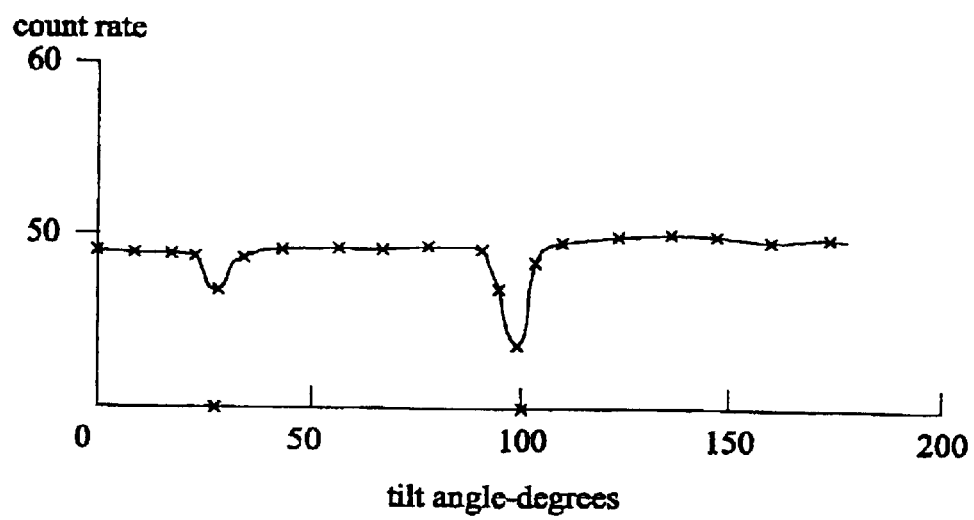
FIG. 6 illustrates typical results obtained with varying tilt angle at a particular pan angle using a detector assembly according to the FIG. 3 embodiment of the invention.

In the second stage of the investigation, therefore, the collimator 40 is panned to an angle for which further investigation is required, for instance the approx 75° pan angle. At this pan angle the moveable shielding component 52 is introduced so as to obscure a part of the slice field of view and a partially occluded count rate is determined. The preferred manner is to obscure one limit of the slice and vary the tilt angle for the moveable shielding component 52 from determination to determination to the other limit, in the illustrated case through 180°. The variation in partially occluded count rate with the different angles, is illustrated in FIG. 6. This provides detailed information on the position or positions of the sources and their levels. In the FIG. 6 example a first source is determined centred on tilt angle 30° and a second source is determined centred on tilt angle 100°. The second source is of a higher level than the first; the count rate drops more significantly when this location is obscured by the moveable shielding component. Processing of the actual count rates leads to an actual level or level range determination for the sources. It is desirable to combine this information with a video image of the field of view so that the sources can be considered alongside that optical information.

In a particularly advantageous form, not illustrated, the camera for taking the optical image of the environment under consideration is provided as a part of the moveable shielding component. This has no detrimental effect on the moveable shielding components effect, indeed as the camera adds to the shielding effect of that component a benefit is obtained. Placing the camera anywhere else has a potential downside as the camera then contributes in an unbalanced way to the shielding effect and attenuation effect. Significant further benefits also arise by placing the camera at this location. Firstly, such a position ensures that the camera obtained images and the field of view of the detector are always perfectly aligned and any parallax issues are avoided when the two image types are combined in presenting the results. This is achieved without the need for an expensive camera as a conventional miniature video camera can be used.

Figure 7:
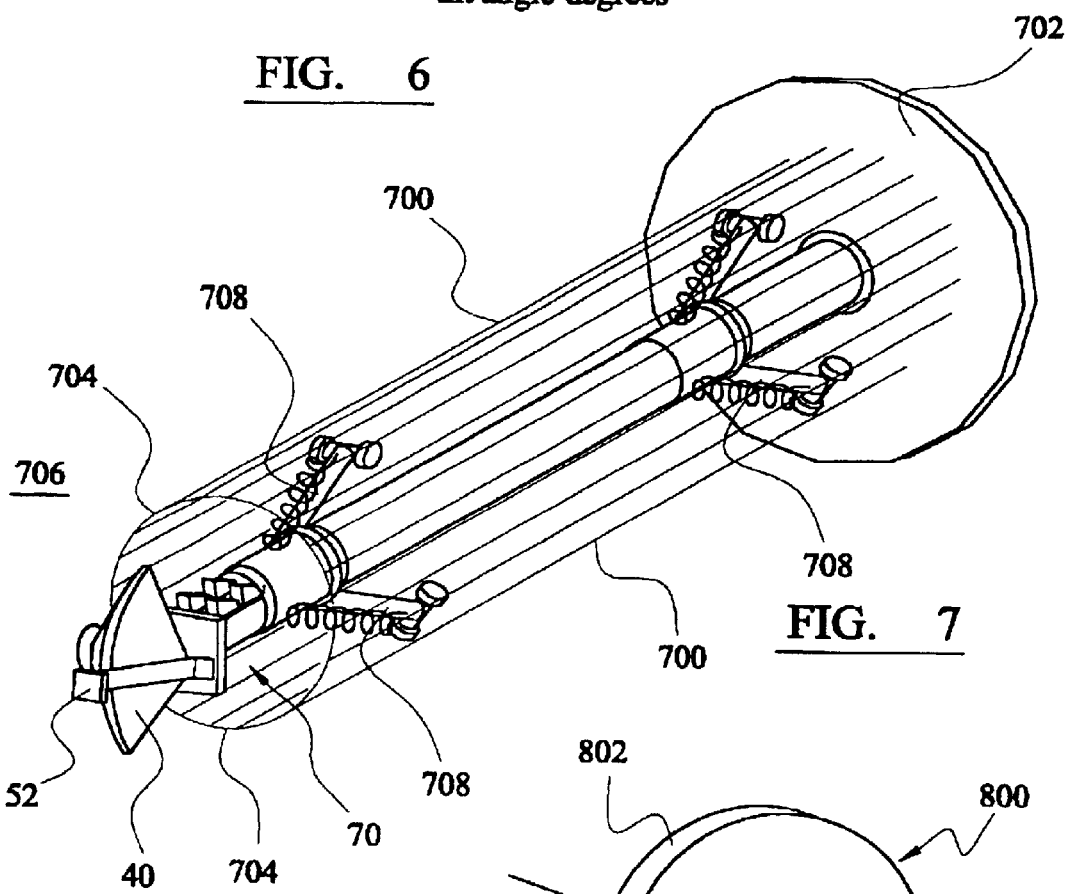
FIG. 7 illustrates an embodiment of a detector assembly deployed.

As previously stated, the generation of the desired information is possible despite the small overall size of the instrument. As illustrated in FIG. 7 the collimator 40 and moveable shielding component 52, together with the motors and other components of the detecting assembly head 70 can be introduced through a 150 mm diameter aperture 700 in the shielded wall leading from the outside 702 to the inside 704, the wall in part defining the chamber 706. The instrument is securely positioned within the aperture 700 and hence relative to the environment to be investigated by the cooperation of legs 708 provided with rollers which engage with the apertures wall. Deployed in this type of position the accuracy of the results are improved as the shielding wall itself assists in reducing the count arising from penetration of the collimator 40 through the material of the collimator 40 in non-field of view directions.

As well as mounting in the aperture as shown in FIG. 7 it is perfectly possible for the instrument to be supported by a robotic arm during use or to be mounted on a tripod or other support frame within the environment.

The instrument exemplified is provided with a 6 mm×6 mm×6 mm scintillator as the actual detector. The scintillator may be of the NaI type and provide an energy range of 30 keV to 1500 keV and a count rate capability above 100,000 cps.

It is desirable that a video camera is pointed centrally at the centre of the field of view under consideration so as to allow the best matching of the emission information and visual information. The measurements can then be made for each point desired, for instance using pan and tilt movement, (particularly with the collimator type of FIG. 3) and the results be overlayed.

The provision of halogen lights on the detector assembly may be desirable where visual imaging of dark environments is sought. To assist with the presentation of the results it may also be desirable to provide a range finder for the centre of the field of view, as part of the detector assembly.

An instrument provided in this way can be introduced through apertures of diameter 150 mm or less, has a head weight of less than 10 kg and yet can provide detailed information in a practical time scale. The time scales will vary with the actual level of emissions being investigated, with typical values being 8+ hours for 150 cps, 50 mins for 1500 cps and 300 sec for 15000 cps. Additional time to provide for movement between measuring locations may be needed. Whilst the collimator measurements may be conducted in a scanning movement or during a stepped scanning movement, the moveable shielding component part of the process will necessitate a stepped process to give sufficient time for the necessary counts to be obtained, in most cases.

Figure 8:
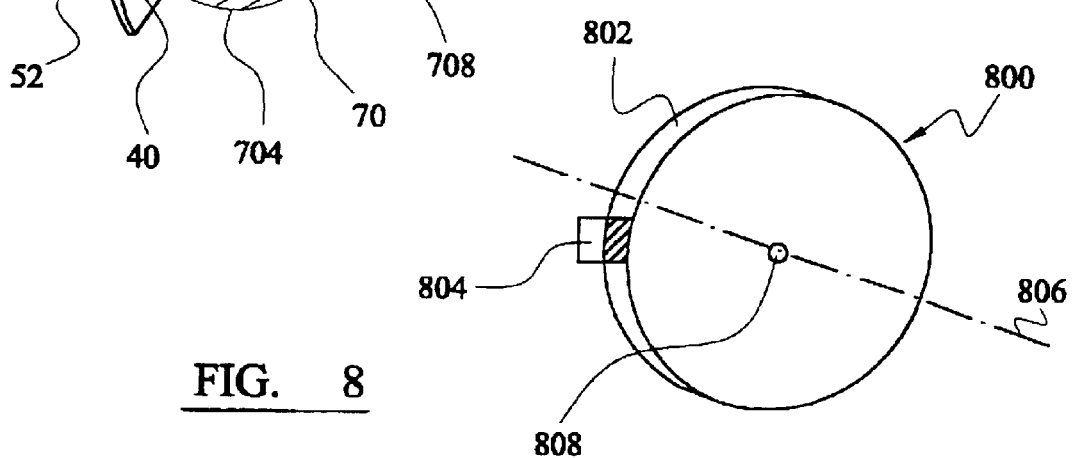
FIG. 8 illustrates a further embodiment of a collimator according to the invention.

As well as the type of system discussed above, it is possible to use other collimator shapes. For instance in FIG. 8 a full disc like collimator 800 is provided with a slit 802 of narrow width which extends around the collimator 800 through 360°. The moveable shielding component 804 in this case is fixed on the collimator 800 and its position in the field of views is changed by rotating the whole collimator 800 about axis 806. The detector 808 is centrally provided.

Figure 9:
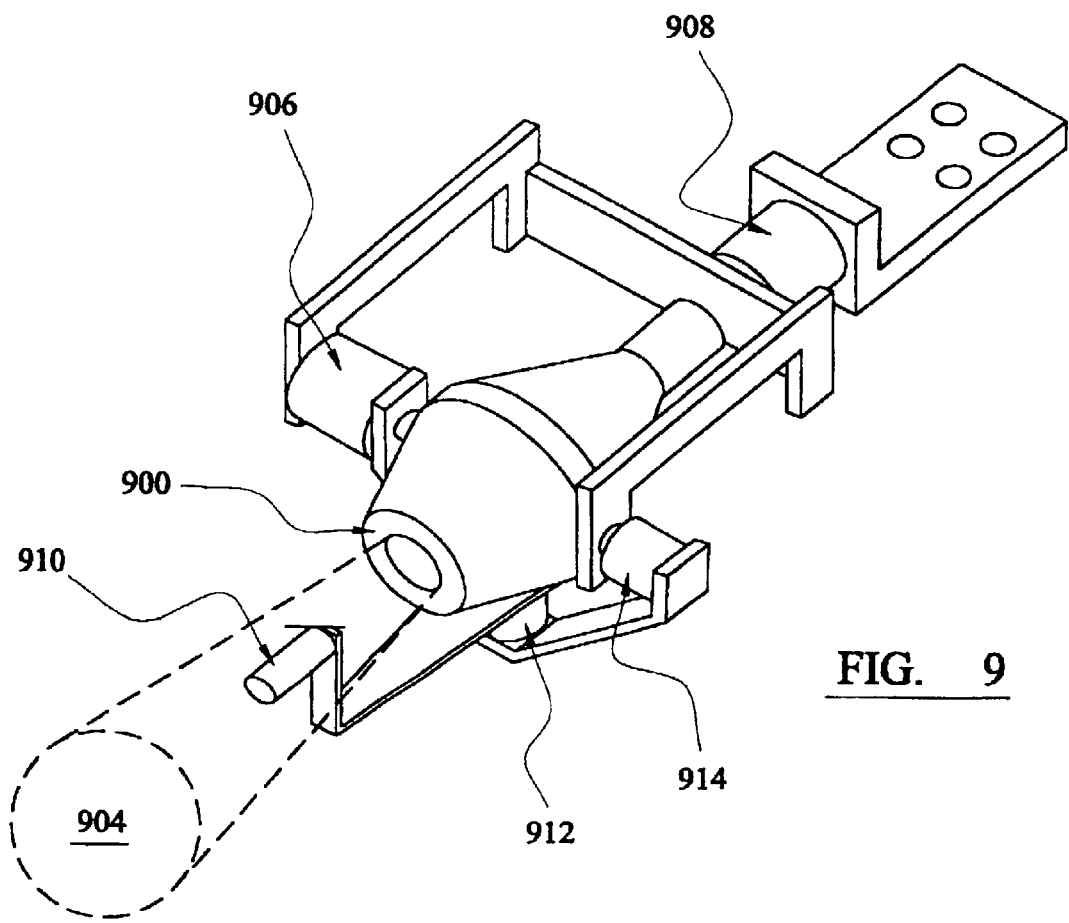
FIG. 9 illustrates a further detector assembly according to the invention.

It is also possible, see FIG. 9, to provide a collimator 900 which features a circular cross-sectioned access to the detector within it and which has a conical field of view 904 as a result. To conduct the first stage of the process with such a collimator it is necessary to scan the environment by moving the collimator to various tilt and pan angles. Thus two motors 906 and 908 are provided for moving the collimator 900. It is also necessary to move the moveable shielding component 910 to various tilt and pan positions within the field of view 904 and so two motors 912 and 914 are needed for this component too. The reduced motor requirement of the FIG. 7 type instrument is an advantage.

The use of the moveable shielding component to achieve directionally informative results requires a significant time. This is because the count rate with the moveable shielding component partially occluding the field of view must be measured to a point where any difference between that and the full field of view count is statistically significant as arising due to occlusion and not just due to variations in count with time. The time periods involved are more significant where low radiation levels are present.

To address this issue it is possible to conduct a first stage using the type of collimator illustrated in FIG. 3 above. The collimator has a large field of view in the vertical direction, around 180°, but a narrow field of view in the horizontal direction, around 5°. Advancing the collimator around a vertical axis causes different stripes of the environment to be considered. The differences in the field of view extent mean that a significant count arising from a field of view can be attributed more closely to a horizontal position than to a vertical position. In the second stage of this alternative technique, however, the direction of scan of the collimator is altered rather than using the deployment of the moveable shielding component.

Figure 10:
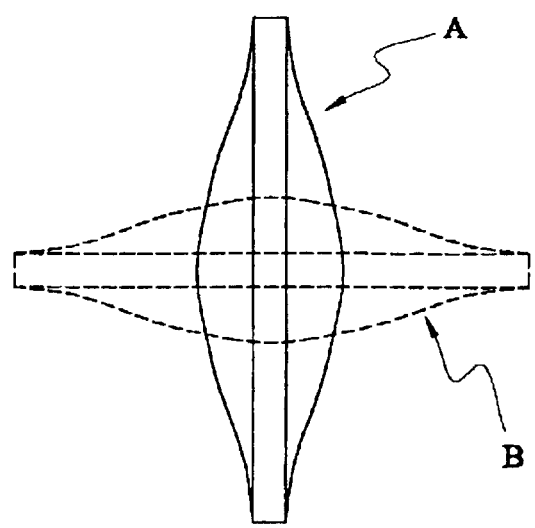
FIG. 10 illustrates the position of the detector assembly of the type illustrated in FIG. 3 in two different scan orientations.

In the second stage the collimator is rotated through 90° such that the narrow field of view corresponds to a vertical view and the wide field of view corresponds to a horizontal view. In this orientation the collimator is rotated about a horizontal axis through a full 180° sweep. Again a series of strips are investigated as a result. The two positions, A and B, are shown schematically in FIG. 10.

Combining the two sets of results means that hotter spots can be narrowed down to particular horizontal angles and vertical angles even without using the moveable shielding component concept. This is achieved quickly as both scanning processes are quick in themselves and is suitable for low count/low radiation environments as high total counts are not necessary to get statistically significant results. Any ambiguities in the results can generally be resolved by the processing stage detailed below.

Figure 11:
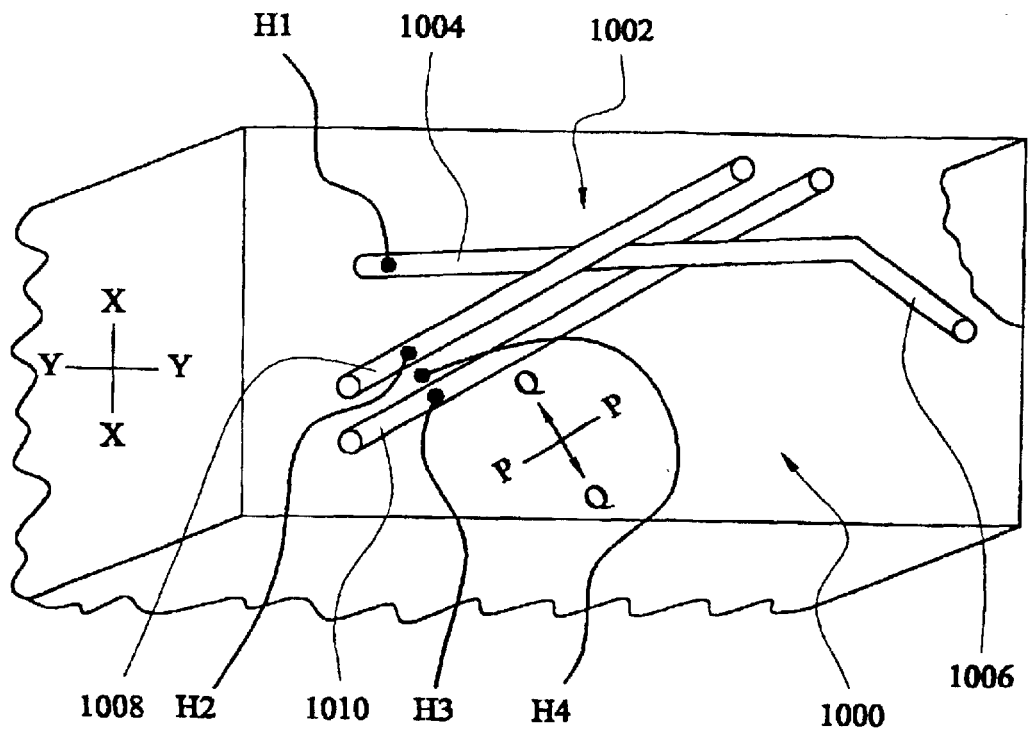
FIG. 11 illustrates the environment and parts thereof being investigated and different ways of scanning that environment.

The angles need not necessarily be horizontal and vertical. However, the effects of floor to wall to ceiling interactions are easiest to deal with using horizontal and vertical scans. Different angles are possible and further angles could be used to supplement the investigations. For instance, as illustrated in FIG. 11, the environment 1000 being investigated may include an array of pipework 1002 including a substantially horizontal pipe 1004 with downward extending dogleg portion 1006, inclined pipe 1008 and further inclined pipe 1010. Using rotation about a vertical axis X to affect a horizontal scan followed by rotation about horizontal axis Y to give a vertical scan is informative about the position of hotspot H1 on pipe 1004. Greater information on the inclined pipes 1008, 1010 and any hotspots thereon can be obtained using different axis of rotation, however. For instance, by using axis Q to affect an inclined scan from left to right, the position of a hotspot can be resolved to particular positions along the pipes 1008 and 1010 i.e. potential hot locations H2 and H3. By conducting a subsequent scan about an axis perpendicular to axis Q, namely axis P, it is possible to determine which of the pipes 1008, 1010 actually have a hotspot, or alternatively as to whether the hotspot actually lies on the wall behind the pipe, for instance at position H4. Thus, the geometry of the environment or of a part of it, in this case the pipework, can be used to assist in the selection of the best scanning directions to clearly identify the hotspots within the environment 1000. Of course the angles of scan need not be perpendicular to one another; such non-perpendicular scans might be used to investigate the position of contamination along pipe 1004, and in particular as to whether it lies on the substantially horizontal part of that pipe, or the downward inclined dogleg 1006.

To increase the level of positional resolution achieved using the instruments and methods of this invention it would be possible to decrease the 5° slit angle. However, even a 1° reduction leads to a significant increase in the mass and physical size of shielding needed to maintain the ability to distinguish between field of view counts and through the shield counts, and that would render the collimator difficult to deploy in many of the desirable applications. The count times would also be greatly increased.

Figure 12:
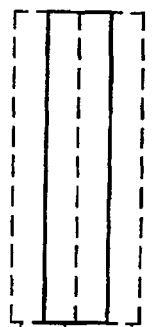
FIG. 12 illustrates how fields of view may be overlapped.

To address this resolution issue in another way the present invention can subject the results to a processing stage, and in particular a statistical analysis. The various fields of view obtained using the type of collimator illustrated in FIG. 10, when the collimator is rotated about the first orientation axis, give a series of fields of view which give relatively poor positional resolution. However, if as illustrated in FIG. 12 the fields of view overlap to an extent, for instance when the collimator is rotated in 2½ steps, then significantly greater positional information can be obtained. Referring to FIG. 12 a first field of view is illustrated by the solid outline 1100. Adjacent fields of view 1102 and 1104 overlap with the field of view 1100 such that all parts of the environment fall within two of the various fields of view. The result from the horizontal scan, for a scan arc of 180° result in 72 different fields of view, each of which has a count or count rate result. When plotted against angles these give the type of results illustrated in FIG. 13 by curve 1120. The suggestion of this curve might be a broadly disperse source centred around angle 150° but extending substantially to either side of that.

Figure 13:
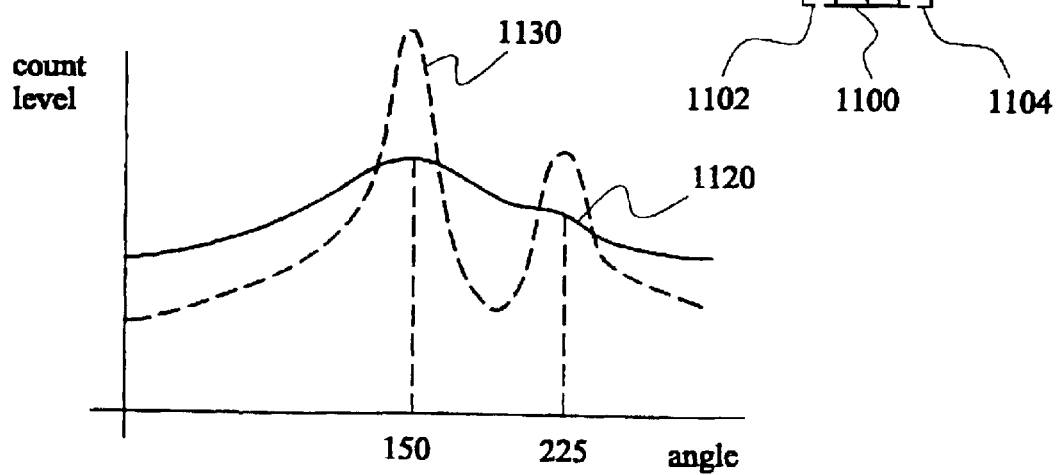
FIG. 13 illustrates the benefit of statistical analysis of the results.

The statistical processing compares the measured response at each angle with a predicted response for a model source or sources locations. The predicted response is first adjusted based upon the known response of the detector to known sources and the known response of the collimator to known sources (information obtained through a calibration exercise). By calculating the difference between the measured result and the predicted result for a given model for each of the fields of view, it is possible to work towards a model which more closely matches the measured results obtained. For instance a least squares based analysis, using an iterative modelling process could be used. Gradually the iterative process works towards minimising the difference between the measured results and the model thereby giving a better indication of the actual sources. The results, as illustrated in FIG. 13, are that the process in effect improves the angular resolution of the collimator and thus more clearly identifies a strong discrete source at angle 150° and a further discrete source at angle 225°, a set of results illustrated by curve 1130. Sources of these levels at these positions give the best fit to the measured results.

Whilst the process is illustrated based on completely overlapping strips, greater resolution could be obtained by presenting parts of the environment to more than two fields of view (for instance a slit angle of 5° and step angle of 1°), but with the downside that the overall count takes far longer to perform, or by only overlapping the fields of view to an extent where only parts of the environment feature within more than one field of view (for instance 5° slit angle and 4° advancement in each step). It would also be possible to not view all of the environment, but a consequential loss of resolution would arise as a result (for instance a 5° slit angle and 8° step wise movement).

What is claimed is:

1. A method of investigating a emissions from radioactive sources in an environment, the method comprising:

providing an instrument, the instrument having a detector assembly, the detector assembly including a detector which generates a signal in response to a detected emission, the detector being provided with a greater level of shielding against emissions in one or more directions than in one or more other directions to define the field of view of the environment for the detector;

introducing the detector assembly of the instrument into the environment;

characterised in that the method further comprises:

providing the instrument with a moveable shielding component which is moveable relative to the field of view;

obtaining a signal count and/or count rate from the detector with at least a part of the environment within the field of view, the moveable shielding component being out of the field of view, the result forming the reference count and/or reference count rate for that given field of view;

obtaining a signal count and/or count rate from the detector for the given field of view, with a part of the given field of view occluded by the moveable shielding component, the result forming the partially occluded view's count and/or count rate for that given field of view with that given part occluded;

for a given occluded part of a given field of view, the reference count and partially occluded view count and/or reference count rate and partially occluded view count rate being considered against one another to provide information about the emissions arising from the given field of view.

2. A method according to claim 1 which includes:

obtaining a signal count and/or count rate from the detector with at least part of the environment within the field of view, the moveable shielding component being out of the field of view;

moving at least part of the detector assembly to place at least another part of the environment within the field of view and obtaining a signal count and/or count rate from the detector for that field of view, the moveable shielding component being out of that field of view;

considering the counts and/or count rates obtained for the two or more different fields of view and selecting one or more areas of the environment for further investigation;

and then obtaining the signal count and/or count rate which result forms the reference count and/or reference count rate for that given field of view and the signal count and/or count rate which result forms the partially occluded view count and/or count rate for that given field of view with that given part occluded.

3. A method according to claim 2 in which signal counts and/or count rates from the detector with at least part of the environment within the field of view, the moveable shielding component being out of the field of view, are obtained for sequential adjoining fields of view.

4. A method according to claim 2 in which the fields of view are abutting or overlapping.

5. A method according to claim 2 in which the consideration of the counts and/or count rates obtained from two or more different fields of view involves considering those fields of view which have counts and/or count rates above a threshold level with those fields of view having a count or count rate above the threshold level being selected.

6. A method according to any claim 2 in which the selected one or more areas of the environment are further investigated by obtaining partially occluded view signal counts and/or count rates for a given field of view with a plurality of different parts of that given field of view occluded.

7. A method according to claim 6 in which the method includes obtaining signal counts and/or count rates with each part of the given field of view occluded.

8. A method according to claim 6 in which different parts of the field of view are partially occluded by moving the moveable shielding component within the field of view of the detector with the field of view of the detector fixed.

9. A method according to claim 1 in which signal counts and/or count rates from the detector for the given field of view are obtained with a plurality of different parts of that given field of view occluded by the moveable shielding component.

10. A method according to claim 9 in which the method includes obtaining signal counts and/or count rates with each part of the given field of view occluded.

11. A method according to claim 9 in which different parts of the field of view are occluded by moving the moveable shielding component within the field of view of the detector, with the field of view of the detector fixed.

12. A method according to claim 1 in which the location (A, B) of the source or sources is determined in three dimensions.

13. A method according to claim 12 in which the location (A, B) is expressed in terms determined by the tilt and pan angles of the detector assembly and in terms of a distance from the detector to the location (A, B).

14. A method according to claim 1 in which video camera or camera images of the environment are taken.

15. A method according to claim 14 in which the video camera or camera is mounted on the moveable shielding component.

16. A method according to claim 1 in which the detector and detector shielding are rotatably mounted about a first axis (Y—Y) and the moveable shielding component is rotatably mounted about a second axis (X2—X2).

17. A method according to claim 16 in which the first and second axes are perpendicular to one another.

18. A method according to claim 1 in which the shielding includes a first generally planar component and a second generally planar component with a gap between them, the gap, at least in part, defining the field of view.

19. A method according to claim 1 in which the shielding includes two opposing planar surfaces and two non-opposing non-planar surfaces, the opposing planar surfaces at least in part defining the field of view, the gap between the opposing planar surfaces being closed by shielding around part of the detector to at least in part further define the field of view.

20. A method according to claim 1 in which the shielding defines a field of view having an angular extent of between 4.5° and 6° in one direction.

21. A method according to claim 1 in which the shielding defines a field of view with an angular extent of between 160° and 200° in a second direction.

22. A method according to claim 1 in which the detector and detector shielding are rotatably mounted about a first axis and a second axis and the moveable shielding component is rotatably mounted about a first axis and a second axis.

23. A method according to claim 22 in which the two first axes are separate from one another and/or the two second axes are separate from one another.

24. A method according to claim 1 in which the shielding comprises a first conical portion and a second conical portion abutting the first conical portion.

25. A method according to claim 24 in which the second conical portion tapers away from the detector and in an opposing direction to the taper of the first conical portion, the detector being provided on a plane defined by the junction of the first and second conical portions.

26. A method according to claim 1 in which the moveable shielding component obscures between 5 and 10% of the field of view.

27. A method according to claim 1 in which means for providing an optical image of the environment are provided on the moveable shielding component.

28. A method according to claim 1 in which the detector assembly is introduced into the environment by insertion through an aperture, the aperture having a maximum diameter of less than 200 mm.

29. A method according to claim 1 in which the signal count and/or count rate for a field of view, with the moveable shielding component out of the field of view is determined using a count period of less than 5 minutes.

30. A method according to claim 1 in which different fields of view are considered sequentially, moving from one field of view to an adjoining one.

31. A method according to claim 1 in which those fields of view which produce high counts and/or count rates are considered as being indicative of one or more sources being within those particular fields of view.

32. A method according to claim 1 in which one or more areas are selected for further investigation.

33. A method according to claim 32 in which the selection involves selecting one or more of the previously measured fields of view for use in the further investigation, the previously obtained count and/or count rate being used to form the reference count and/or count rate for the selected field of view.

34. A method according to claim 32 in which the selection includes the selection of one or more fields of view not corresponding to a previously measured field of view, count and/or count rate from the detector for that field of view being obtained with the moveable shielding component out of the field of view, that signal count and/or count rate forming the reference count and/or reference count rate for that selected field of view.

35. A method according to claim 32 in which partially occluded view signal counts and/or count rates are obtained for a given field of view with a plurality of different parts of that given field of view occluded, the partially occluded view count and/or count rates for the plurality of different occluded views being considered together with the reference count and/or reference count rate for that given field of view to provide information about the emissions arising from that given field of view.

36. A method according to claim 1 in which different partially occluded views are obtained by moving the moveable shielding component within the field of view of the detector.

* * * * *